Patented Mar. 4, 1941

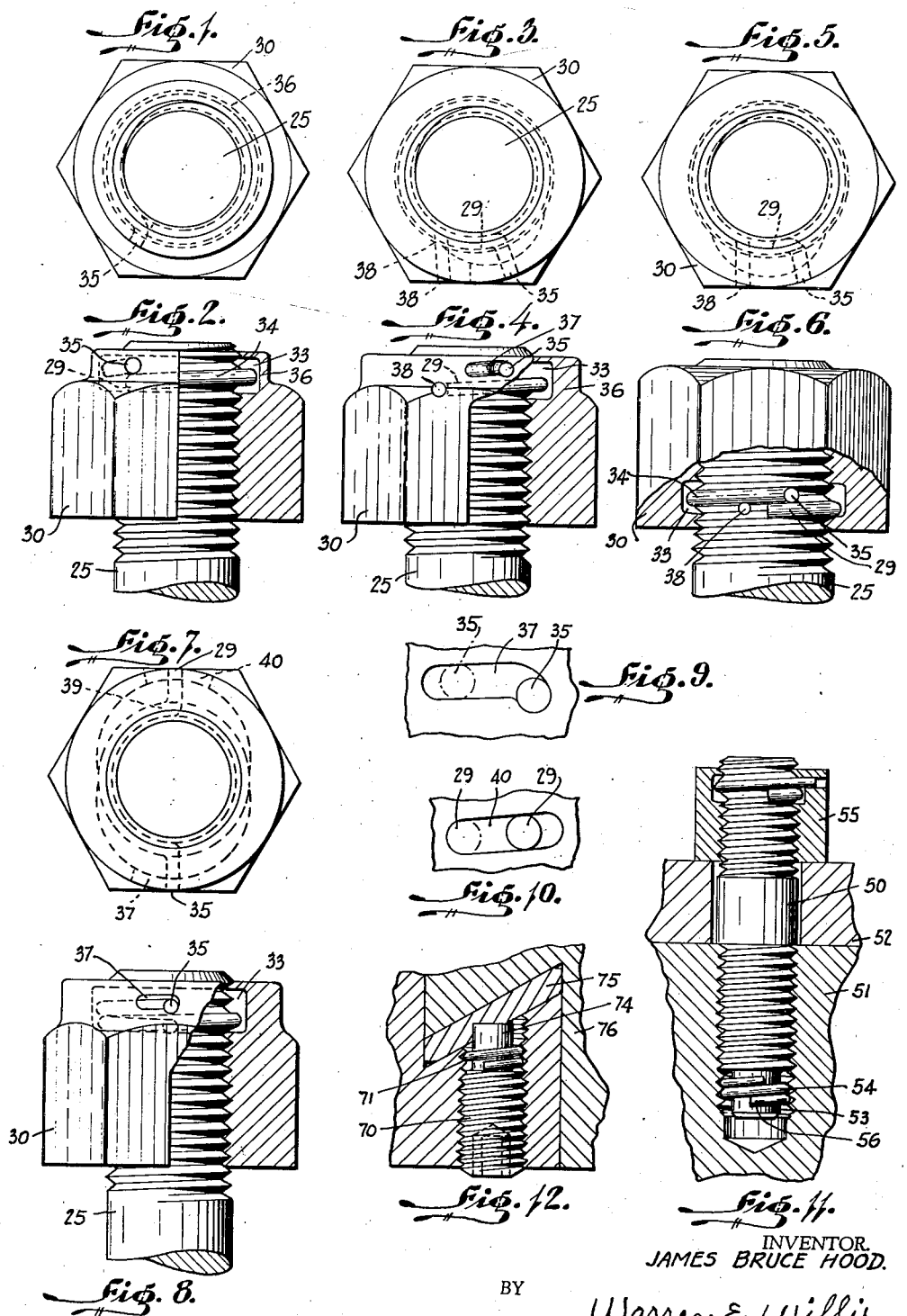
March 4, 1941.  J. B. HOOD  2,233,889
SCREW THREADED ELEMENT
Filed June 20, 1938
INVENTOR.
JAMES BRUCE HOOD.
BY Warren E. Willis,
ATTORNEY.

2,233,889

UNITED STATES PATENT OFFICE 2,233,889

SCREW THREADED ELEMENT

James Bruce Hood, New York, N. Y.

Application June 20, 1938, Serial No. 214,705

1 Claim. (Cl. 151—30)

This invention has for its object, the prevention of screw elements when engaged with each other, from involuntary disengagement by reason of vibration, overstrain, or planetary action of the parts so held together.

The essential features in this invention are, a helical spring of any cross section suitable for engagement with the type of thread on the screw element, and, of any number of coils or parts thereof combined with (in the one case) a nut or female screw element, and, (in the other case) a bolt or male screw element.

Such a spring, made to a lesser diameter than the male screw element which it engages, when associated with the nut or female screw element is a complete assembly or unit, and conversely, such a spring made to a greater diameter than the engaging nut or female screw element when associated with the bolt or male screw element, is a complete assembly unit, thus insuring an initial grip between the two screw elements when engagement takes place.

It is essential that the pitch of the spring be in accord with that of its associate, and of course the engaging element.

Freedom of movement for the lock spring to expand or contract and center itself on the engaging member is provided for by the clearance allowed between the spring and chamber wall.

Such locking device occurs on one of the engaging elements only, either the nut or the bolt, whichever is considered the more appropriate under given circumstances.

This invention also provides means to prevent breakage or injury of the locking spring, for cases where the band friction may exceed the strength of the spring due to rust or hard paint.

How the above features are incorporated with screw elements will now be explained in detail, and, by reference to the accompanying drawing, in which:

Figure 1 is a top plan view of a nut made in accordance with the invention.

Figure 2 is a partial side elevational, partial sectional view of the nut shown in Fig. 1.

Figure 3 is a top plan view of a nut similar to Fig. 1 but showing an additional safety feature.

Figure 4 is a partial side, partial sectional view of the same.

Figure 5 is a top plan view showing a modification of the nut shown in Fig. 3, and in which the friction element is in the base of the nut.

Figure 6 is a side elevational view of the same, parts being broken away to show the construction.

Figure 7 is a plan view of a further modified form of nut.

Figure 8 is a side and sectional view of the same.

Figure 9 is a schematic view, drawn to an enlarged scale, of the safety slot in Figs. 3 to 8.

Figure 10 is a similar view of the slot shown as an alternative to that in Figures 3 to 6.

Figure 11 is a side elevational view of a stud equipped with embodiments of the invention.

Figure 12 is a side elevational view of a gib screw, showing its application and provided with the spring locking device.

Figures 1 and 2 show respectively a top plan and part sectional elevation of an engaged nut and screw, the nut having incorporated the locking feature.

The nut body 30, has an annular chamber 33, which may be in any longitudinal position in the nut body, in this case near the top or slightly projecting above it. This chamber contains a locking spring 34, which has its anchored end 35 bent abruptly outwardly to enter through the hole for it, in the wall 36 surrounding the chamber.

The location of the hole assures the spring helix and nut thread being in pitch, allows the spring to center itself on the bolt, with ample clearance for freedom of spring action, and will not drop out and get lost when the nut is not engaged on a bolt.

The spring is forced on and off the engaging bolt 25 by this bent out end 35; pushing the spring ahead when engagement is made causes the spring to open and offers little resistance to engagement, whereas pulling the spring off by this bent out end causes the spring to close on the thread of the bolt, increasing the grip and consequently resistance to disengagement.

Figures 3 and 4 are respectively plan and part sectional elevation of another form of this invention showing a nut and bolt engaged, the nut proper is as in the last form described, but with additional safety feature.

As the spring lock functions exactly as that in the case just described, it will not be necessary to repeat the description which is common to both cases.

The safety device consists of a specially shaped slot 37, in the wall 36 surrounding the spring chamber 33, instead of merely a round hole for anchorage of the spring end 35; a pin 38, driven tight into a hole in the body of the nut at the correct location, penetrates far enough to substantially fill the groove of the thread on the bolt 25 so that if the nut body is moved around anticlockwise, while the spring remained stationary the pin would contact the free end 29 of the spring and push it ahead, off the thread of the bolt 25.

To clearly understand the action of this safety device it is necessary to refer to Figure 9, showing an enlarged elevation of the slot 37, with the anchor end of the spring 35 seated in the pocket of the slot 37; the angle which the center line of the slot makes with the horizontal is that of the pitch of the screw thread.

Any force to turn the nut in an anticlockwise direction (for a right hand thread) will also move the spring in that direction so long as the resistance of the spring to being so moved is less than the resistance of the spring end 35 to slip out of the pocket of the slot 37 by being forced up the shoulder thereof into the inclined slot.

When this occurs, the nut continues to move around without the spring, and with decreased resistance, until the pin 38 contacts the free end 29 of the spring, then both move together to complete the disengagement; the end of the slot 37 approaching towards the anchorage end of the spring 35 must not make contact with it, for that would defeat the purpose of the pin 38.

In this way the resistance to removal of the nut from the bolt may never exceed that required to slip the anchorage of the spring; the pocket of the slot is designed so that the anchorage will slip before any damage to the locking spring may occur. For nuts of this type it is better that the spring should have more than one coil, say one and one third coils approximately.

Figures 5 and 6 show a plan and part sectional elevational view respectively of a nut and bolt in engagement; the sectional part of the nut exposes to view the location of the locking spring and its chamber, in this case near the bottom of the nut.

The detailed explanation and numerals used for Figs. 3 and 4 serve equally for this case of Figs. 5 and 6. The only difference being the location of the locking spring and its chamber, shown thus to emphasize that there is no restriction as to location along the nut.

Figures 7 and 8 respectively show a plan and part sectional elevation of another modified form of this invention; the change from that shown in Figs. 3 and 4 being that the spring has one and one half helical turns, that the lower or free end 29 of the spring is bent abruptly outward normal to the circumference of the spring at the bend 39 which enters the slot 40, shown enlarged in Figure 10; all other features are common to that shown in the several figures.

In taking this nut off a bolt, the spring end 35 slips its anchorage from the pocket in slot 37, as the nut rotates the end of slot 40 contacts free end 29 of the spring and thus carries it off the bolt thread.

This slot 40, together with the bent out end 29 of the spring, is alternative to the use of a pin 38 as shown.

It will be noticed that the chamber 33 in Figs. 7 and 8, is of a figure eight shape, this thins down the chamber wall 36 at points diametrically opposite where the respective slots 37 and 40 may be punched for the spring ends 35 and 29 respectively.

The slots 37 and 40, in Figs. 9 and 10, should be studied together; as already explained for slot 37, the spring end 35 may slip its anchorage when the nut is being removed from a bolt, and as removal of the nut continues, the approaching end of slot 40 contacts free end of spring 29, the spring is thus carried around with the nut. The other end 35 of the spring, which has slipped its anchorage in slot 37, will lie somewhere along the main part of the slot and nearer to the end of the slot remote from the pocket but must not be in contact with that end.

The slot 40 is long enough and wide enough to allow the free end 29 of spring ample freedom of movement to function as a lock, when in normal position, with its end 35 in its anchorage.

In Fig. 9 the full line circle shows spring end 35 in its normal position anchored; the broken line shows its approximate position after slipping the anchorage and at the instant when the end of the slot 40 picks up the free end 29 of the spring.

In Fig. 10 the full line circle shows the normal position of the free end 29 of the spring, while the broken line shows its position when the anchorage has slipped and the end 29 is being pushed around by the end of the slot 40.

When a nut with this device is reengaged with a bolt and the lock spring is in the off position it will slip back to normal position by reason of the resistance to engagement of the free end of the spring, which must expand as it engages the thread of the bolt, thus the lock is fully automatic.

Figure 11 shows a stud, as it appears screwed into a tapped hole, such as the flange of a cylinder 51, its head 52, being held by the nut 55.

The lower end of the stud has a reduced portion 53, on to which the lock-spring 54, is placed; the bent in end 56 of the spring enters a hole drilled radially in the reduced end of the stud, and in pitch with the thread.

The spring is made to a greater diameter than the tapped hole, so that when the stud is screwed into the tapped hole, the spring engaging the threaded hole is sprung down to a smaller diameter, as the engagement proceeds; the threaded part of the stud follows the lock-spring down until the stud is home.

If when assembled it is desired to remove the cylinder head, the nut is taken off in the usual way, without any chance that the stud may unscrew with the nut, inasmuch as the resistance to unscrewing the stud is greater than that to unscrew the nut.

This is accomplished by increasing the number of turns of the lock-spring on the end of the stud to more than those of the lock-spring associated with the nut. It will be noticed that as shown the spring on the stud has approximately two turns, whilst the one on the nut has approximately one and one-third turns.

The stud of course may be removed by using a wrench, but requires a greater torque than that required to remove the nut; neither of them would become loose due to vibration.

The spring on the stud is in direct compression when the stud is being removed, because the anchored end of the spring is at the bottom and acts as a driver, pushing the spring ahead and tending to expand it into the V groove of the thread of the tapped hole.

In this way the band frictional resistance is invoked, but, in the reverse manner to that employed with the nut lock-spring; thus is demonstrated the application of the principle to male screw elements.

Figure 12 shows an elevation of a gib screw 70, with the locking device 71, in position on the end of the screw bearing on the gib 75, which in turn bears on the slide 76.

The spring 71 has its bent end 72 anchored in hole 73 in the reduced end 74, of the gib screw 70; as these screws are made with a hexagon hole for the driver, no check nut is required.

Having shown and described the construction and application of the several forms of this invention to male and female screw elements, which are based on sound engineering principles, and are novel, useful, and an improvement in the art of holding screwed elements in positive engagement, what is claimed as new and sought to secure by Letters Patent, is:

In screw threaded elements respectively male and female, a spring having more than one coil wound in conformity with the pitch of the screw threads, a transverse slot in the female element disposed at an angle corresponding to the pitch, said slot terminating at its raised end in a down-reaching pocket having one wall at the critical angle of friction with a plane parallel to the axis of the threaded elements, said pocket constituting means to anchor one end of said spring, its other end being freely mounted, said spring releasable when friction causes the anchored end to slip in said slot.

JAMES BRUCE HOOD.